(12) United States Patent
Vallee et al.

(10) Patent No.: US 7,824,808 B2
(45) Date of Patent: Nov. 2, 2010

(54) POLYIMIDE-BASED LITHIUM METAL BATTERY

(75) Inventors: Allain Vallee, Varennes (CA); Dany Brouillette, Brossard (CA); James K. Pugh, Pinellas Park, FL (US); Wade W. Guindy, Henderson, NV (US)

(73) Assignee: Solicore, Inc., Lakeland, FL (US)

( * ) Notice: Subject to any disclaimer, the term of this patent is extended or adjusted under 35 U.S.C. 154(b) by 150 days.

(21) Appl. No.: 12/108,014

(22) Filed: Apr. 23, 2008

(65) Prior Publication Data

US 2008/0206648 A1 Aug. 28, 2008

Related U.S. Application Data

(62) Division of application No. 10/628,290, filed on Jul. 29, 2003, now Pat. No. 7,390,336.

(51) Int. Cl.
 H01M 6/16 (2006.01)
 H01M 4/00 (2006.01)
 H01M 4/50 (2006.01)
 H01M 4/58 (2006.01)
 H01M 6/18 (2006.01)

(52) U.S. Cl. .................. 429/324; 429/221; 429/224; 429/231.1; 429/231.3; 429/231.5; 429/231.95; 429/307; 429/314; 429/340

(58) Field of Classification Search ........ 429/221, 429/224, 231.1, 231.3, 231.5, 231.95, 307, 429/314, 324, 340
See application file for complete search history.

(56) References Cited

U.S. PATENT DOCUMENTS

| | | | |
|---|---|---|---|
| 4,830,939 A * | 5/1989 | Lee et al. ............. | 429/312 |
| 4,882,243 A | 11/1989 | Skotheim et al. | |
| 5,019,467 A | 5/1991 | Fujiwara | |
| 5,056,145 A | 10/1991 | Yamamoto et al. | |
| 5,380,606 A | 1/1995 | Itou et al. | |
| 5,468,571 A | 11/1995 | Fujimoto et al. | |
| 5,506,073 A | 4/1996 | Angell et al. | |

(Continued)

FOREIGN PATENT DOCUMENTS

CA 2272782 11/1999

(Continued)

OTHER PUBLICATIONS

U.S. Appl. No. 11/061,751, filed Feb. 18, 2005, Nelson et al.

(Continued)

*Primary Examiner*—Patrick Ryan
*Assistant Examiner*—Thomas H. Parsons
(74) *Attorney, Agent, or Firm*—Morris, Manning & Martin, LLP; Christopher W. Raimund

(57) ABSTRACT

The present invention relates to Lithium Metal batteries. In particular, it is related to lithium metal batteries containing a polyimide-based electrolyte. The present invention concerns a new concept of polyimide-based electrolytic component having an electrolyte comprising of at least one solvent and at least one alkali metal salt, with specific amounts of solvents, to optimize the properties of conductivity of the polyimide-based electrolyte and the mechanical properties of the polyimide-based electrolyte separator towards metallic lithium anode to prevent dendrites growths.

18 Claims, 1 Drawing Sheet

U.S. PATENT DOCUMENTS

| | | | |
|---|---|---|---|
| 5,599,993 | A | 2/1997 | Hergenrother et al. |
| 5,601,947 | A | 2/1997 | Skotheim et al. |
| 5,670,273 | A * | 9/1997 | Velasquez et al. .......... 429/162 |
| 5,677,568 | A | 10/1997 | Ochi et al. |
| 5,690,702 | A | 11/1997 | Skotheim et al. |
| 5,735,040 | A | 4/1998 | Ochi et al. |
| 5,755,985 | A * | 5/1998 | Vallee et al. .............. 252/62.2 |
| 5,786,110 | A | 7/1998 | Angell et al. |
| 5,888,672 | A | 3/1999 | Gustafson et al. |
| 5,895,731 | A | 4/1999 | Clingempeel |
| 5,925,283 | A | 7/1999 | Taniuchi et al. |
| 6,001,507 | A | 12/1999 | Ono et al. |
| 6,013,393 | A | 1/2000 | Taniuchi et al. |
| 6,096,234 | A | 8/2000 | Nakanishi et al. |
| 6,109,530 | A | 8/2000 | Larson et al. |
| 6,114,068 | A | 9/2000 | Yamada et al. |
| 6,136,476 | A | 10/2000 | Schutts et al. |
| 6,148,503 | A | 11/2000 | Delnick et al. |
| 6,291,106 | B1 | 9/2001 | Diado et al. |
| 6,296,971 | B1 | 10/2001 | Hara |
| 6,315,918 | B1 | 11/2001 | Mita et al. |
| 6,406,817 | B2 | 6/2002 | Wariishi et al. |
| 6,413,675 | B1 | 7/2002 | Harda et al. |
| 6,451,480 | B1 | 9/2002 | Gustafson et al. |
| 6,465,134 | B1 | 10/2002 | Shibuya et al. |
| 6,503,831 | B2 | 1/2003 | Speakman |
| 6,509,123 | B1 | 1/2003 | Shibuya et al. |
| 6,534,214 | B1 | 3/2003 | Nishijima et al. |
| 6,596,440 | B2 | 7/2003 | Gavelin et al. |
| 6,617,074 | B1 | 9/2003 | Watarai et al. |
| 6,632,564 | B1 | 10/2003 | Takahashi et al. |
| 6,641,957 | B1 | 11/2003 | Kawaguchi et al. |
| 6,673,495 | B1 | 1/2004 | Nishiuri et al. |
| 6,713,389 | B2 | 3/2004 | Speakman |
| 2001/0038937 | A1 | 11/2001 | Suzuki et al. |
| 2002/0128034 | A1 | 9/2002 | Stratmoen et al. |
| 2002/0153424 | A1 | 10/2002 | Li |
| 2002/0160272 | A1 | 10/2002 | Tanaka et al. |
| 2002/0177039 | A1 | 11/2002 | Lu et al. |
| 2002/0187377 | A1 | 12/2002 | Shinoda et al. |
| 2003/0059681 | A1 | 3/2003 | Noh |
| 2003/0194607 | A1 | 10/2003 | Huang |
| 2003/0222755 | A1 | 12/2003 | Kemper et al. |
| 2004/0009403 | A1 | 1/2004 | Kim et al. |
| 2004/0018424 | A1 | 1/2004 | Zhang et al. |
| 2004/0043290 | A1 | 3/2004 | Hatta |
| 2004/0229118 | A1 | 11/2004 | Wensley |
| 2004/0229127 | A1 | 11/2004 | Wensley |
| 2005/0026042 | A1 | 2/2005 | Vallee et al. |
| 2005/0153209 | A1 | 7/2005 | Vallee et al. |

FOREIGN PATENT DOCUMENTS

| | | |
|---|---|---|
| EP | 0 821 368 | 1/1998 |
| EP | 0 823 744 | 2/1998 |
| EP | 0 825 619 | 2/1998 |
| JP | 05-285665 | 10/1993 |
| JP | 06-131422 | 5/1996 |
| JP | 08-344237 | 12/1996 |
| JP | 10-129213 | 5/1998 |
| JP | 10-190609 | 7/1998 |
| WO | WO 99/32929 | 7/1999 |
| WO | WO 02/13304 | 2/2002 |
| WO | WO 02/063073 | 8/2002 |

OTHER PUBLICATIONS

U.S. Appl. No. 11/115,193, filed Apr. 27, 2005, Wensley et al.
U.S. Appl. No. 11/127,299, filed May 12, 2005, Nelson et al.
U.S. Appl. No. 11/187,440, filed Jul. 22, 2005, Nelson et al.
U.S. Appl. No. 11/191,922, filed Jul. 29, 2005, Wensley et al.
International Search Report, Dec. 17, 2004.
Levine et al., "Electrochemical behavior of the polypyrrole/ polyimide composite by potential step amperometry," Journal of Power Sources, vol. 124, pp. 355-359, (2003).
Meador at al., "Effects of Branching on Rod-Coil Block Polyimides as Membrane Materials for Lithium Polymer Batteries," Chem. Mater., vol. 15, No. 15, pp. 3018-3025, (2003).
Munnik et al., "Stopping power measurements of 0.5-10.5 MeV$^{\wedge}$7Li ions in polyimide, vyns, formvar, and polysulfone," Journal of Applied Physics, vol. 86, No. 7, 00. 3934-3938, (Oct. 1999).
Nie et al., "Novel Polymeric Aromatic Lithium Sulfonylimides as Salts for Polymer Electrolytes," Journal of Applied Polymer Science, vol. 85, pp. 1802-1805, (2002).
Tokuda et al., "Synthesis, Characterization, and Ion-Conductive Behavior in an Organic Solvent and in a Polyether of a Novel Lithium Salt of a Perfluorinated Polyimide Anion," Marcromolecules, vol. 35, No. 4, pp. 1403-1411, (2002).
Viehbeck at al., "Electrochemical Properties of Polyimides and Related Imide Compounds," Journal of the Electrochemical Society, vol. 137, No. 5, pp. 1460-1466, (May 1990).

* cited by examiner

POLYIMIDE-BASED LITHIUM METAL BATTERY

This is a division of U.S. patent application Ser. No. 10/628,290, filed Jul. 29, 2003 now U.S. Pat. No. 7,390,336, which is herein incorporated by reference in its entirety.

BACKGROUND

1. Field of the Invention

The present invention relates to Lithium Metal batteries. In particular, it is related to lithium metal batteries containing a polyimide-based electrolyte.

2. Background of the Invention

During the last ten years, lithium batteries of the primary and rechargeable type have been the object of a considerable number of research and development works. The intent was to develop a battery which is safe, inexpensive, having a large energetic content and good electrochemical performance. In this context, a plurality of a battery designs were developed to meet different applications, such as microelectronics, telecommunications, portable computers and electrical vehicles, to name only a few.

Electrochemical batteries or generators, whether rechargeable or not, are all made of an anode which can consist of a metal such as lithium and alloys thereof, or an insertion compound which is reversible towards lithium, such as carbon, a cathode which consists of an insertion compound which is reversible towards lithium such as transitional metal oxide, a mechanical separator and an electrolytic component placed in between the electrodes. The term electrolytic component means any material placed inside the generator and which is used as ionic transport except electrode materials in which the ions Li+ may be displaced. During the discharge or charge of the generator, the electrolytic component ensures the transport of ionic species through the entire generator from one electrode to the other and even inside the composite electrodes. In lithium batteries, the electrolytic component is generally in the form of a liquid which is called liquid electrolyte or a dry or gel polymer matrix which may also act as mechanical separator.

When the electrolytic component is in liquid form, it consists of an alkali metal salt which is dissolved in an aprotic solvent. In the case of a lithium generator, the more common salts are $LiPF_6$, $LiBF_4$ and $LiN(SO_2CF_3)_2$ and the polar aprotic solvents may be selected from propylene carbonate, ethylene carbonate, Y-butyrolactone and 1,3-dioxolane or their analogs to name only a few. At the level of the separator, the liquid electrolyte is generally impregnated in a porous polymer matrix which is inert towards the aprotic solvent used, or in a fiberglass paper. The use of a liquid electrolyte which is impregnated in an inert polymer matrix enables to preserve a sufficient ionic mobility to reach a level of conductivity of the order of 10-3 S/cm at 25° C. At the level of the composite electrodes, when the latter are made of an insertion material which is bound by a polymer matrix which is inert towards aprotic solvents, which have only little interaction with the latter, the liquid electrolyte fills the porosity of the electrode. Examples of batteries utilizing a liquid electrolytic component are found in U.S. Pat. Nos. 5,422,203; 5,626,985 and 5,630,993.

When the electrolytic component is in the form of a dry polymer matrix, it consists of a high molecular weight homo or copolymer, which is cross-linkable or non cross-linkable and includes a heteroatom in its repeating unit such as oxygen or nitrogen for example, in which an alkali metal salt is dissolved such as $LiN(SO_2CF_3)_2$, $LiSO_3CF_3$ and $LiClO_4$. Polyethylene oxide is a good example of a polymer matrix which is capable of solving different alkali metal salts. Armand, in U.S. Pat. No. 4,303,748, describes families of polymers which may be used as electrolytic component in lithium batteries. More elaborated families of polymers (cross-linkable or non cross-linkable copolymers and terpolymers) are described in U.S. Pat. Nos. 4,578,326; 4,357,401; 4,579,793; 4,758,483 and in Canadian Patent No. 1,269,702. The use of a high molecular weight polymer enables to provide electrolytes in the form of thin films (of the order of 10 to 100 μm) which have sufficiently good mechanical properties to be used entirely as separator between the anode and the cathode while ensuring ionic transport between the electrodes. In the composite, the solid electrolyte serves as binder for the materials of the electrode and ensures ionic transport through the composite. The use of a cross-linkable polymer enables to utilize a polymer of lower molecular weight, which facilitates the preparation of the separator as well as the composite and also enables to increase the mechanical properties of the separator and, by the same token, to increase its resistance against the growth of dendrites when using a metallic lithium anode. As is well known in the art, repeated charge/discharge cycles can cause growth of dendrites on the lithium metal electrode. These dendrites can grow to such an extent that they penetrate the separator between positive and negative electrodes and create an internal short circuit. For this reason, metallic lithium anodes are used exclusively with solid polymer electrolyte separator sufficiently resistant and opaque to prevent dendrite growth from piercing its layer and reaching the positive electrode. Contrary to a liquid electrolyte, a solid polymer electrolyte is safer because it cannot spill nor be evaporated from the generator. Its disadvantage results from a lower ionic mobility obtained in these solid electrolytes which restricts their uses at temperatures between 40° C. and 100° C.

The gel electrolytic component is itself generally constituted of a polymer matrix which is solvating or non-solvating for lithium salts, aprotic solvent, and an alkali metal salt being impregnated in the polymer matrix. The most common salts are $LiPF_6$, $LiBF_4$, and $LiN(SO_2CF_3)_2$ and the polar aprotic solvents may be selected from propylene carbonate, ethylene carbonate, butyrolactones, and 1,3-dioxolane, to name only a few. The gels may be obtained from a high molecular weight homo or copolymer which is cross-linkable or non cross-linkable or from a cross-linkable homo or copolymer. In the latter case, the dimensional stability of the gel is ensured by cross-linking the polymer matrix. Polyethers including cross-linkable functions such as alkyls, acrylates or methacrylates are good examples of polymers which may be used in formulating a gel electrolyte, such as described in U.S. Pat. No. 4,830,939. This is explained by their capacity to solvate lithium salts and their compatibility with polar aprotic solvents as well as their low cost, and ease of handling and cross-linking. A gel electrolyte has the advantage of being handled as a solid and of not spilling out of the generator as is the case with liquid electrolyte generators. Ionic transport efficiency is associated with the proportion of aprotic solvent incorporated in the polymer matrix. Depending on the nature of the polymer matrix, the salt, the plasticizing agent and its proportion in the matrix, a gel may reach an ionic conductivity of the order of 10-3 S/cm at 25° C. while remaining macroscopically solid. As in the case of a dry electrolyte, a gel electrolyte may be used as separator between the anode and cathode while ensuring ionic transport between the electrodes. In the composite electrode(s) of the generator, the gel electrolyte is used as binder for the materials of the electrode (s), and ensures ionic transport through the composite electrode(s). However, the loss of mechanical property resulting from the addition of the liquid phase (aprotic solvent) should generally be compensated by the addition of solid fillers, by cross-linking the polymer matrix whenever possible, or in some cases, when the proportion of liquid is too high, by using a porous mechanical separator which is impregnated with the gel which serves as electrolytic component in the separator.

The poor resistance of polyethers towards oxidation is however an important problem which is associated with the utilization of solid and gel electrolytes based on polyether as the electrolytic material in which the voltage in recharge may reach and even exceed 3.5V to 3.7 V. This results in an important loss of capacity of the generator which is caused by the more or less massive degradation of the polymer matrix during consecutive cycles of discharge/charge.

Gustafson et al. (U.S. Pat. No. 5,888,672) disclose a battery where the anode, the cathode, and the electrolyte each comprise a soluble, amorphous, thermoplastic polyimide. Since the polyimides are pre-imidized prior to the fabrication of the battery, there is no need to further cure them at high temperatures, thus reducing the risk of damaging the battery. The polyimide based electrolyte is resistant towards oxidation and capable of high ionic conductivity at or near room temperature. Nor is there a chance of incidental condensation as the battery temperature rises. In addition, since no further polymerization will occur, there are no by-products of the condensation reaction (water) to interact with the lithium salts. The battery of Gustafson et al. is said to be a dry cell.

In fabricating the battery, an electrolyte solution comprising a soluble, amorphous, thermoplastic polyimide solution and a lithium salt is prepared. The thermoplastic polyimide solution is prepared by mixing about 8% to about 20% by weight of a thermoplastic polyimide powder with about 80% to about 92% by weight of a solvent. About 20% to about 35% by weight of a lithium salt is dissolved in about 65% to about 80% by weight of a solvent to form a solution. The solution is then mixed with the thermoplastic polyimide solution to form the electrolyte solution. The electrolyte comprises from about 2% by weight to 10% by weight of soluble, amorphous, thermoplastic polyimide, from about 1% by weight to 12% by weight of the lithium salt and from about 78% by weight to 97% by weight of the solvent. An electrolyte layer is then formed by casting a film of the electrolyte solution which is fully dried in an oven at about 150° C. for about 30 to 60 minutes to create a dry, opaque, flexible, smooth, tough film. The polyimide based electrolyte solution is dried at the flash point of the solvent for the purpose of removing the solvent such that a dry electrolyte is obtained. The soluble, amorphous, thermoplastic polyimide may be any soluble, amorphous, thermoplastic polyimide known to those skilled in the art.

Laboratory tests have since demonstrated that a dried polyimide based electrolyte separator has poor ionic conductivity and as such is inadequate for battery applications with a metallic lithium anode. As described above, a lithium metal anode requires an electrolyte separator that presents enough mechanical resistance to prevent potential dendrite growths from piercing the electrolyte separator layer, reaching the positive electrode and causing a short circuit but it also requires a minimum of ionic conductivity to perform as an electrochemical generator.

Gustafson et al. (U.S. Pat. No. 6,451,480 issued Sep. 17, 2002) later on disclosed a Polyimide-based lithium-ion battery in which the anode and the cathode are prepared from an electrolyte polyimide binder solution comprising from about 9% by weight to about 15% by weight of a pre-imidized soluble, amorphous, thermoplastic polyimide powder dissolved in about 75% by weight to about 85% by weight of a polar solvent; and from about 6% by weight to about 12% by weight of a lithium salt and an electrolyte separator consisting of a typical separator film saturated with a liquid electrolyte solution of lithium salts dissolved in a variety of organic solvents such as ethylene carbonate mixed with dimethyl carbonate. A cell stack is assembled and placed in a container which is then filled with the electrolyte and sealed. Evidently, the ionic conduction is achieved by the solvent content of the electrolyte separator and of the composite anode and cathode. The cell is based on Li-ion technology using a liquid electrolyte and therefore cannot be combined with a metallic lithium anode as the high solvent content renders the electrolyte separator unable to prevent dendrites growth. Furthermore, the typical solvent used in Li-ion technology are unstable with metallic lithium anode; their resistance increasing with time.

Thus there is a need for an improved polyimide-based electrolyte having good ionic conductivity and capable of operating with a lithium metal anode.

BRIEF SUMMARY OF THE INVENTION

It is therefore an object of the present invention is to provide a polyimide-based electrolyte adapted for operation with a lithium metal anode.

Another object of the present invention to provide a polyimide-based battery adapted for operation with a lithium metal anode.

Another object of the present invention is to provide a process for making a polyimide-based battery having a metallic lithium anode.

As embodied and broadly described, the invention provides a battery comprising:
at least one metallic lithium anode;
at least one cathode,
and a polyimide-based electrolyte separator disposed between said at least one metallic lithium anode and said at least one cathode; the polyimide-based electrolyte separator comprising a soluble, polyimide, a lithium salt, and from about 10% by weight to about 60% by weight of solvent.

As embodied and broadly described, the invention further provides an electrolyte comprising a soluble, polyimide, a lithium salt, and from about 10% by weight to about 60% by weight of solvent As embodied and broadly described, the invention further provides a process for preparing a battery, the process comprising the steps of:
a) preparing a metallic lithium or lithium alloy sheet;
b) preparing a cathode slurry comprising an insertion compound; an electronic conductive filler; a lithium salt and an ionically conductive electrolyte binder;
c) preparing an electrolyte solution comprising a soluble, polyimide, a lithium salt, and from about 10% by weight to about 60% by weight of solvent;
d) applying said cathode slurry onto a current collector to form a cathode film;
e) applying said electrolyte solution onto said cathode film to form an electrolyte separator;
f) applying said metallic lithium or lithium alloy sheet onto said electrolyte separator to form an electrochemical cell.

The present invention concerns a new concept of polyimide-based electrolytic component having an electrolyte comprising at least one solvent and at least one alkali metal salt, with specific amounts of solvents, to optimize the properties of conductivity of the polyimide-based electrolyte and the mechanical properties of the polyimide-based electrolyte separator towards metallic lithium anode to prevent dendrites growth.

BRIEF DESCRIPTION OF THE DRAWINGS

The invention will be better understood and other advantages will appear by means of the following description and the following drawings in which.

DETAILED DESCRIPTION OF THE INVENTION

Figure 1:
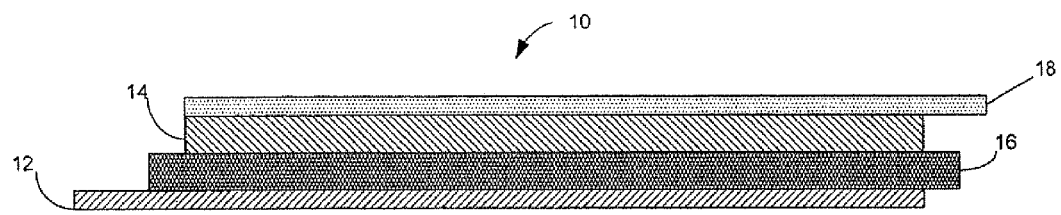
FIG. 1 is a schematic cross-sectional view of a battery according to one embodiment of the present invention.

FIG. 1 is a schematic cross-sectional view of a battery 11 according to one embodiment of the present invention. In particular, the battery 10 comprises at least one lithium metal anode 12, at least one composite cathode 14, at least one electrolyte separator 16 disposed between each lithium metal anode 12 and each composite cathode 14. The lithium metal anode 12 comprises a thin sheet of metallic lithium or alloy thereof. The composite cathode comprises of a mixture of an active material such as a transitional metal oxide; an electronic conductive filler such as carbon black; and an ionically conductive electrolyte polymer binder comprising a lithium salt. The electrolyte polymer binder may be an electrolyte polyimide binder comprising an alkali metal salt or a polyether binder also comprising an alkali metal salt. The composite cathode 14 is supported by a metal current collector 18 typically made of thin aluminum foil. The electrolyte separator 16 comprises a soluble polyimide swollen with 10% weight to 40% weight of a solvent and at least one alkali metal salt preferably a lithium salt. % by weight of solvent is calculated as the weight of solvent divided by the total weight of electrolyte which includes polyimide, alkali metal salt and solvent.

The alkali metal salt(s) may be for example salts based on lithium trifluorosulfonimide described in U.S. Pat. No. 4,505, 997, $LIPF_6$, $LiBF_4$, $LiSO_3CF_3$, $LiClO_4$, and LiSCN, etc. The nature of the salt is not a limitation of the present invention.

The solvent(s) may for example be selected from N,N-methylpyrrolidinone (NMP), Y-butyrolactone, and sulfamides of formula; $R_1R_2N$—$SO_2$—$NR_3R_4$, in which $R_1$, $R_2$, $R_3$ and $R_4$ are alkyls having between 1 and 6 carbon atoms and/or oxyalkyls having between 1 and 6 carbon atoms or combinations thereof. Preferably the solvent or combination of solvents is (are) polar aprotic solvent(s). The nature of the solvent is not a limitation of the present invention.

The active material of the cathode may be selected from cobalt oxide, nickel oxide, nickel cobalt oxide, nickel cobalt aluminum oxide, manganese oxide ($LiMn_2O_4$) or their analogs for so-called 4 V cathodes or among cathodes of less hand 4 V such as phosphates or other polyanions of transition metals such as $LiFePO_4$, Nasicon structures also including $V_2O_5$, $LiV_3O_8$ and $MnO_2$. The nature of the active material is not a limitation of the present invention.

As previously mentioned, the electrolyte separator 16 comprises a soluble polyimide swollen with 10% weight to 40% weight of a solvent and at least one alkali metal salt preferably a lithium salt. The soluble polyimide may be any soluble polyimide known to those skilled in the art. Specific examples include but are not limited to: MATRIMID XU5218 commercially available from Ciba-Geigy; ULTEM 1000P commercially available from General Electric; LaRC-CP1, LaRC-CP2, and LaRC-Si available from Imitec, Inc., Schenectady, N.Y. The soluble polyimides used in the present invention are fully imidized and are usually powder in form.

In order to produce a film, coating, or a slurry from the polyimide, the polyimide powder must first be dissolved in a solvent such as N,N-methylpyrrolidinone (NMP) and Gamma-butyrolactone to name a few in order to form a polyimide solution. Note that the polyimides dissolve in these solvents. In addition, large amounts of lithium salts can be dissolved in these polyimide solutions without disturbing the polymer matrix. The polyimide solution is then partially dried at a temperature suitable to evaporate excess solvent in order to obtain a polyimide solution containing between 10% and 40% by weight of solvent and form a polyimide based electrolyte.

In order to operate with a lithium metal anode, it is imperative that the solvent content in the polyimide based electrolyte be such that the electrolyte layer 16 remains a compact separator capable of maintaining an efficient barrier at the surface of the lithium metal anode 12 against dendrite growth. In a preferred embodiment, the electrolyte comprises from about 10% by weight to about 60% by weight of the soluble polyimide, from about 5% by weight to about 20% by weight of the lithium salt and from about 10% by weight to about 60% by weight of solvent. In a more preferred embodiment, the electrolyte comprises from about 20% by weight to about 50% by weight of the soluble polyimide, from about 5% by weight to about 20% by weight of the lithium salt and from about 20% by weight to about 40% by weight of solvent.

Figure 2:
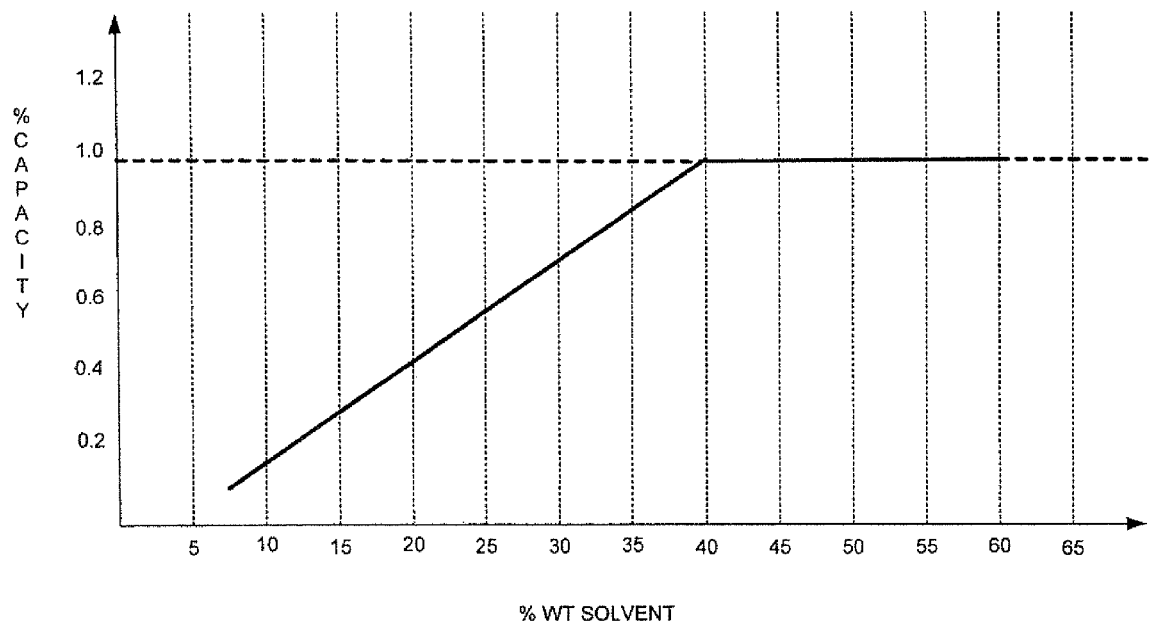
FIG. 2 is a graph illustrating the relationship between the discharge capacity of a polyimide-based electrochemical cell and the solvent content of the polyimide-based electrolyte; and, FIG. 3 is a schematic cross-sectional view of a bi-face configured electrochemical cell according to one embodiment of the present invention.

As illustrated in FIG. 2, the ideal compromise between discharge capacity (ionic conductivity) and the polyimide based electrolyte's mechanical resistance is reached at levels of between about 15% by weight to about 40% by weight of solvent. In this range, the polyimide based electrolyte has good ionic conductivity at 25° C. and is sufficiently firm to prevent dendrites growths at the surface of the metallic lithium anode. As shown in FIG. 2, the extracted capacity at a specific C-rate is directly proportional to the percentage by weight of solvent in the polyimide electrolyte. The relation between discharge capacity and percentage by weight of solvent in the electrolyte is almost linear however the polyimide based electrolyte assumes more solid mechanical properties at levels of solvent content below 60% and ideally below 40% by weight. At 20% to 40% by weight of solvent, the polyimide based electrolyte exhibits excellent ionic conductivity yet its matrix is firm and compact enough to inhibit dendrites growths at the surface of the metallic lithium anode. In light of this relation, the solvent content in the polyimide electrolyte may be modulated as a function of the application of the polyimide-based battery. For example, an application requiring a low discharge current (low C-rate), the polyimide electrolyte of the battery may contain less solvent than for application requiring high discharge current (high C-rate) such that the solvent content in the polyimide electrolyte may be optimized. It however remains within the specific range of 10% to 60% by weight and preferably within the specific range of 15% to 40% by weight.

Figure 3:
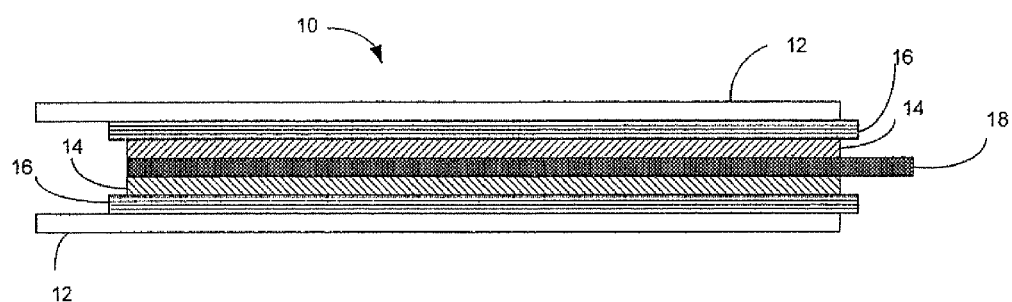

In one specific embodiment of the invention as shown in FIG. 3, a cathode layer 14 is coated or otherwise layered on both sides of a thin metal current collector 18. Each cathode layer 14 comprises an electrochemically active material such as a transitional metal oxide ($LiCoO_2$; $LiMnO_2$; $LiNiO_2$; $LiV_3O_8$; $Li_4Ti_5O_{12}$; $V_6O_{13}$; $V_2O_5$; and $LiMn_2O_4$ and their equivalents); an electronic conductive filler such as conductive carbon, carbon black, graphite, and graphite fiber; and an ionically conductive electrolyte polymer binder. The ionically conductive electrolyte polymer binder preferably comprises a lithium salt and comprises either a polyether based mono, ter or co-polymer or a pre-imidized soluble, polyimide powder. The lithium salt and the polymer are soluble in any polar solvent known to those of ordinary skill in the art.

A polyimide based electrolyte separator 16 comprising about 45-60% by weight of the soluble polyimide, about 10-15% by weight of the lithium salt and about 20-40% by weight of a solvent preferably a polar aprotic solvent, is then coated onto each cathode layer 14 to form a bi-face configured half-cell. To complete the electrochemical cell, a lithium or lithium alloy metal anode 12 is finally positioned over each polyimide based electrolyte separator 16.

The cathode layer 14 and the polyimide based electrolyte separator 16 may also be coated or otherwise applied onto polypropylene support films separately and then laminated together as is well known in the art.

When preparing the polyimide based electrolyte, a solution is first prepared with an excess of solvent to ensure proper mixing of the polyimide powder and the lithium salt. Next, the solution may be either dried to obtain a specific content of solvent (20-40%) prior to coating or laminating onto the cathode layers 14 of the cell 10 or the polyimide based electrolyte may be coated or laminated with its excess solvent and thereafter dried to obtain a specific solvent content such as 20-40% by weight as described above.

In an alternative embodiment of the invention, the polyimide powder and a lithium salt are first dissolved in the solvent to form a polyimide solution. To the polyimide solution is added a cross linkable co-monomer and optionally a cross-linking initiator. The polyimide solution is then either partially dried prior to assembly or assembled with excess solvent as described above. Once layered onto each cathode layer 14, cross-linking of the polyimide electrolyte is carried out thermally, by UV radiation or with electron beam (EB). The cross-linked polyimide electrolyte has improved mechanical resistance over the non-cross-linked electrolyte.

In fabricating a battery, a lithium metal based anode 12, a separator film 16, and a cathode 14 are assembled in alternate layers to form a cell stack. The separator film 16 needs to be positioned between the anode 12 and the cathode layers 14 to prevent shorting in the cell. The cell may be monoface or bi-face and may be stacked in prismatic, folded, wound, cylindrical, or jelly rolled configuration as is well known to those skilled in the art. Once the cells stack is formed, pressure is preferably applied to the cells stack and maintained. The pressurized cells stack is placed in a container wherein the pressure on the stack is maintained. The cells stack must be assembled using pressure to improve interlayer conductivity. The pressure is maintained when the cells stack in placed into a battery container.

In a further alternative embodiment of the invention, a separator film may be used as a barrier between each anode and cathode layer. The separator film is a freestanding film comprised of an organic polymer, such as polypropylene. Examples of such films include but are not limited to Kynar FLEX from Atochem North America; and CELGARD 3401 from Polyplastics Co., Ltd. The freestanding separator film is either partially soaked with a solution of polyimide based electrolyte with the specific solvent content within the preferred range or the freestanding separator film is saturated with a solution of polyimide based electrolyte having excess solvent and partially dried to obtain the desired percentage by weight of solvent.

The manufacture of the battery is completed after the cell is placed in the package, as described earlier. At this point the battery can be charged to store an electric charge and it is then ready for use.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A battery comprising:
   at least one metallic lithium or lithium alloy anode;
   at least one cathode,
   and a polyimide-based electrolyte separator disposed between said at least one metallic lithium or lithium alloy anode and said at least one cathode,
   said polyimide-based electrolyte separator comprising a soluble polyimide, a lithium salt, and from about 10% by weight to about 60% by weight of solvent.

2. The battery of claim 1, wherein said polyimide-based electrolyte separator comprises from about 15% by weight to about 50% by weight of solvent.

3. The battery of claim 1, wherein said polyimide-based electrolyte separator comprises from about 20% by weight to about 40% by weight of solvent.

4. The battery of claim 1, wherein said solvent is selected from the group consisting of N,N-methylpyrrolidinone (NMP), gammabutyrolactone, and sulfamides of formula; $R_1R_2N—SO_2—NR_3R_4$ in which $R_1$, $R_2$, $R_3$ and $R_4$ are alkyls having between 1 and 6 carbon atoms and/or oxyalkyls having between 1 and 6 carbon atoms or combinations thereof 5. The battery of claim 1, wherein said at least one cathode comprises a current collector, an active material, an electronic conductive filler, and an ionically conductive electrolyte polyimide binder, wherein said electrolyte polyimide binder comprises a lithium salt and a pre-imidized soluble polyimide, and wherein the lithium salt and the pre-imidized soluble polyimide are soluble in a polar solvent.

6. The battery of claim 5, wherein said active material is selected from the group consisting of: $LiCoO_2$; $LiMnO_2$; $LiMn_2O_4$; $LiNiO_2$; $LiV_3O_8$; $V_2O_5$; $Li_4Ti_5O_{12}$; and $LiFePO_4$.

7. The battery of claim 1, wherein said at least one cathode comprises a current collector, an active material, an electronic conductive filler, an ionically conductive electrolyte polyether, and a lithium salt.

8. The battery of claim 7, wherein said active material is selected from the group consisting of: $LiCoO_2$; $LiMnO_2$; $LiMn_2O_4$; $LiNiO_2$; $LiV_3O_8$; $V_2O_5$; $Li_4Ti_5O_{12}$; and $LiFePO_4$.

9. The battery of claim 1, wherein said lithium salt is selected from the group consisting of lithium trifluorosulfonimide, lithium salts derived from bis perhalogenoacyl and bis sulfonylimide, LiCl, LiBr, LiI, $Li(ClO_4)$, $Li(BF_4)$, $Li(PF_6)$, $Li(AsF_6)$, $Li(CH_3CO_2)$, $Li(CF_3\ SO_3)$, $Li(CF_3\ SO_2)_2\ N$, $Li(CF_3\ SO_2)_3$, $Li(CF_3CO_2)$, $Li(B(C_6H_5)_4)$, $Li(SCN)$, and $Li(NO_3)$.

10. The battery of claim 1, wherein said battery holds an electric charge.

11. An electrolyte film comprising a soluble polyimide, a lithium salt, and from about 10% by weight to about 60% by weight of solvent.

12. The electrolyte film of claim 11, comprising from about 15% by weight to about 50% by weight of solvent.

13. The electrolyte film of claim 11, comprising from about 20% by weight to about 40% by weight of solvent.

14. The electrolyte film of claim 11, wherein said solvent is selected from the group consisting of N,N-methylpyrrolidinone (NMP), gamma-butyrolactone, and sulfamides of formula $R_1R_2N-SO_2-NR_3R_4$ in which $R_1$, $R_2$, $R_3$ and $R_4$ are alkyls having between 1 and 6 carbon atoms and/or oxyalkyls having between 1 and 6 carbon atoms or combinations thereof.

15. A battery comprising:
    at least one anode;
    at least one cathode, and
    a polyimide-based electrolyte separator disposed between said at least one anode and said at least one cathode, the polyimide-based electrolyte separator comprising a cross linked polyimide matrix, a lithium salt, and from about 10% by weight to about 60% by weight of solvent.

16. The battery of claim 15, wherein said polyimide-based electrolyte separator comprises from about 15% by weight to about 50% by weight of solvent.

17. The battery of claim 15, wherein said polyimide-based electrolyte separator comprises from about 20% by weight to about 40% by weight of solvent.

18. The battery of claim 15, wherein said solvent is selected from the group consisting of N,N-methylpyrrolidinone (NMP), gamma-butyrolactone, and sulfamides of formula $R_1R_2N-SO_2-NR_3R_4$ in which $R_1$, $R_2$, $R_3$ and $R_4$ are alkyls having between 1 and 6 carbon atoms and/or oxyalkyls having between 1 and 6 carbon atoms or combinations thereof.

* * * * *